US012625397B2

(12) United States Patent
Oron et al.

(10) Patent No.: US 12,625,397 B2
(45) Date of Patent: May 12, 2026

(54) LOW VOLTAGE TRAVELING WAVE ELECTRO-ABSORPTION MODULATOR FOR HIGH BANDWIDTH OPERATION

(71) Applicant: Mellanox Technologies, Ltd., Yokneam (IL)

(72) Inventors: Moshe B. Oron, Rehovot (IL); Oren Steinberg, Tal Shahar (IL); Isabelle Cestier, Haifa (IL); Elad Mentovich, Tel Aviv (IL); Timothy De Keulenaer, Ghent (BE)

(73) Assignee: Mellanox Technologies, Ltd., Yokneam (IL)

( * ) Notice: Subject to any disclaimer, the term of this patent is extended or adjusted under 35 U.S.C. 154(b) by 275 days.

(21) Appl. No.: 18/120,802

(22) Filed: Mar. 13, 2023

(65) Prior Publication Data

US 2024/0310662 A1 Sep. 19, 2024

(51) Int. Cl.
*G02F 1/035* (2006.01)
*G02F 1/015* (2006.01)
(52) U.S. Cl.
CPC ............ G02F 1/035 (2013.01); G02F 1/0157 (2021.01); *G02F 2201/127* (2013.01)
(58) Field of Classification Search
CPC .......................... G02F 1/0157; G02F 2201/127
USPC .......................................................... 385/1–3
See application file for complete search history.

(56) References Cited

U.S. PATENT DOCUMENTS

| | | |
|---|---|---|
| 6,345,131 B1 | 2/2002 | Jang |
| 6,597,011 B1 | 7/2003 | Atanackovic |
| 6,914,706 B2 | 7/2005 | Ishimura |

| | | |
|---|---|---|
| 7,010,179 B2 | 3/2006 | Hatta et al. |
| 7,409,123 B1 | 8/2008 | Feng |
| 7,542,641 B1 | 6/2009 | Asghari |
| 7,658,552 B2 | 2/2010 | Asghari |

(Continued)

FOREIGN PATENT DOCUMENTS

| | | | |
|---|---|---|---|
| CN | 3462232 A1 * | 9/2017 | ............. G02F 1/015 |
| CN | 108563041 A | 9/2018 | |

(Continued)

OTHER PUBLICATIONS

"Very low input voltage cascaded travelling wave electroabsorption modulator (CTWEAM) for more than 100 Gbps" by Islam et al, Optics Communications, vol. 297, pp. 43-47 (Year: 2013).*

(Continued)

*Primary Examiner* — Robert Tavlykaev

(74) *Attorney, Agent, or Firm* — Moore & Van Allen PLLC; Michele M. Glessner

(57) ABSTRACT

Systems and methods are described herein for an electro-absorption modulator (EAM) device. An example EAM device comprises an optical waveguide comprising a waveguide core configured to facilitate a propagation of an optical signal therethrough; a segmented traveling wave electrode structure comprising electrode segments disposed on the optical waveguide; and an electrical transmission line operatively coupled to the electrode segments via conducting bridges, wherein the electrical transmission line is configured to facilitate a propagation of an electrical signal therethrough, wherein the electrode segments are configured to overcome bandwidth and extinction ratio constraints of a lumped EAM.

20 Claims, 7 Drawing Sheets

(56)    References Cited

U.S. PATENT DOCUMENTS

| 7,917,035 | B2 | 3/2011 | Asghari |
| 8,090,231 | B1 | 1/2012 | Asghari |
| 8,160,404 | B2 | 4/2012 | Pan |
| 8,242,432 | B2 | 8/2012 | Feng |
| 8,346,028 | B2 | 1/2013 | Feng |
| 8,411,260 | B1 | 4/2013 | Feng |
| 8,463,088 | B1 | 6/2013 | Asghari |
| 8,476,576 | B2 | 7/2013 | Dong |
| 8,526,769 | B1 | 9/2013 | Feng |
| 8,638,485 | B2 | 1/2014 | Feng |
| 8,724,100 | B1 | 5/2014 | Asghari |
| 8,728,837 | B2 | 5/2014 | Fong |
| 8,737,772 | B2 | 5/2014 | Dong |
| 8,817,354 | B2 | 8/2014 | Feng |
| 8,897,606 | B2 | 11/2014 | Asghari |
| 8,965,208 | B2 | 2/2015 | Asghari |
| 8,989,522 | B2 | 3/2015 | Qian |
| 9,025,241 | B2 | 5/2015 | Asghari |
| 9,142,698 | B1 | 9/2015 | Cunningham |
| 9,217,831 | B1 | 12/2015 | Asghari |
| 9,217,836 | B2 | 12/2015 | Asghari |
| 9,244,327 | B2 | 1/2016 | Prosyk |
| 9,274,353 | B1 | 3/2016 | Dong |
| 9,279,936 | B2 | 3/2016 | Qian |
| 9,312,960 | B1 | 4/2016 | Feng |
| 9,379,515 | B1 | 6/2016 | Asghari |
| 9,588,294 | B2 | 3/2017 | Fong |
| 9,702,278 | B2 | 7/2017 | Gruener |
| 9,798,166 | B1 | 10/2017 | Sharma |
| 9,952,456 | B2 * | 4/2018 | Huang ............... G02B 6/12002 |
| 9,966,733 | B2 | 5/2018 | Feng |
| 9,991,965 | B2 | 6/2018 | Christensen |
| 10,031,355 | B2 | 7/2018 | Feng |
| 10,078,232 | B1 | 9/2018 | Vermeulen |
| 10,288,805 | B2 | 5/2019 | Luff |
| 10,330,864 | B2 | 6/2019 | Asghari |
| 10,394,060 | B2 | 8/2019 | Mentovich |
| 10,649,244 | B1 | 5/2020 | Mentovich |
| 10,895,797 | B2 | 1/2021 | Cavaliere |
| 11,397,363 | B2 | 7/2022 | Kawakami |
| 2003/0147574 | A1 | 8/2003 | Lam et al. |
| 2007/0009195 | A1 * | 1/2007 | Eriksson ................. G02F 1/035 |
| | | | 385/40 |
| 2008/0170821 | A1 | 7/2008 | Kissa et al. |
| 2009/0297088 | A1 * | 12/2009 | Koh ...................... G02F 1/0356 |
| | | | 385/2 |
| 2010/0330727 | A1 | 12/2010 | Hill |
| 2012/0251029 | A1 | 10/2012 | Kobrinsky |
| 2013/0182305 | A1 | 7/2013 | Feng |
| 2015/0010263 | A1 | 1/2015 | Fong |
| 2015/0055911 | A1 | 2/2015 | Bowers |
| 2016/0349541 | A1 | 12/2016 | Velthaus et al. |
| 2017/0269391 | A1 | 9/2017 | Feng |
| 2017/0351124 | A1 | 12/2017 | Roth |
| 2018/0129082 | A1 | 5/2018 | Lin et al. |
| 2018/0314128 | A1 | 11/2018 | Sun |
| 2019/0179177 | A1 | 6/2019 | Rickman |
| 2019/0187495 | A1 | 6/2019 | Melikyan et al. |
| 2019/0293971 | A1 | 9/2019 | Yu |
| 2020/0012043 | A1 | 1/2020 | Abediasl |
| 2020/0124878 | A1 | 4/2020 | Yu |
| 2021/0191164 | A1 | 6/2021 | Mentovich |
| 2021/0226409 | A1 | 7/2021 | Grillanda et al. |
| 2021/0336418 | A1 | 10/2021 | Iakovlev |
| 2022/0236619 | A1 | 7/2022 | Hoessbacher |
| 2022/0337321 | A1 | 10/2022 | Argyris |
| 2023/0018578 | A1 | 1/2023 | Bakopoulos |
| 2023/0127711 | A1 * | 4/2023 | Maglio ............... G02F 1/01725 |
| | | | 359/245 |
| 2024/0027706 | A1 | 1/2024 | Tadayon et al. |

FOREIGN PATENT DOCUMENTS

| WO | 2020149953 A1 | 7/2020 |
| WO | 2022200292 A1 | 9/2022 |

OTHER PUBLICATIONS

Related U.S. Appl. No. 63/266,527, filed Jan. 7, 2022, entitled "High Bandwidth Travelling Wave Electro Absorption Modulator (EAM) Chip".

Related U.S. Appl. No. 17/644,625, filed Dec. 16, 2021, entitled "High Bandwidth Optical Modulator".

Related U.S. Appl. No. 17/694,159, filed Mar. 14, 2022, entitled "Serial Data Conversion Redundacy Using Optical Modulators".

Related U.S. Appl. No. 17/810,068, filed Jun. 30, 2022, entitled "High Bandwidth Travelling Wave Electro Absorption Modulator (EAM) Chip".

Related U.S. Appl. No. 17/993,296, filed Nov. 23, 2022, entitled "Traveling Wave Cascaded Micro Ring Modulators".

Related U.S. Appl. No. 18/120,719, filed Mar. 13, 2023, entitled "Differential Traveling Wave Electro-Absorption Modulator for High Bandwidth Operation".

Nakai, Y. et al. (2019), "Uncooled Operation of 53-GBd PAM4 (106-Gb/s) EA/DFB Lasers With Extremely Low Drive Voltage With 0.9 Vpp," Journal of Lightwave Technology, vol. 37, Issue 7, pp. 1658-1662.

Tamura, M. et al. (2003), "High-speed electroabsorption modulators using ruthenium-doped SI—InP: impact of interdiffusion-free burying technology on E/O modulation characteristics," International Conference on Indium Phosphide and Related Materials, 2003. pp. 491-494.

Hou et al. (2010), "Monolithic 40 GHz passively Mode-locked AlGaInAs/InP 1.55 mm MQW Laser with Surface-etched Bragg Gratings," European Conference on Integrated Optics (ECIO 10).

D. A. B. Miller et al. (1984), "Band-Edge Electroabsorption in Quantum Well Structures: The Quantum-Confined Stark Effect," Phys. Rev. Lett. 53, 2173.

Bin Wang et al. (2022), "Principles of Selective Area Epitaxy and Applications in III-V Semiconductor Lasers Using MOCVD: A Review," Crystals 2022, 12(7), 1011.

Ackermann, M. et al., "Sub-wavelength tunneling barrier in rib waveguide microring modulators with vanishing pending losses," Opt. Lett. 47, 2626-2629 (2022).

Akiyama, S. et al. "Cascaded-ring-resonator-loaded Mach-Zehnder modulator for enhanced modulation efficiency in wide optical bandwith," Opt. Expr. 20, 16321-16338 (2012).

Akiyama, Suguru et al. "InP-Based Mach-Zehnder Modulator With Capacitively Loaded Travelling-Wave Electrodes," Journal of Lightwave Technology, vol. 26, No. 5, Mar. 1, 2008, pp. 608-615, DOI: 10.1109/JLT.2007.915278.

Chacinski, Marck et al. "Monolithically Integrated 100 Ghz DFB-TWEAM," Journal of Lightwave Technology, vol. 27, No. 16, Aug. 15, 2009, pp. 3410-3415, DOI: 10.1109/JLT.2009.2015773. Available online: URL: https://opg.optica.org/jlt/abstract.cfmuri=jlt-27-16-3410.

Cui, Yansong et al. "Modeling and Design of GaAs Traveling-Wave electrooptic Modulators Based on Capacitively Loaded Coplanar Strips," Journal of Lightwave Technology, vol. 24, No. 1, Jan. 2006, pp. 544-554, DOI: 10.1109/JLT.2005.859851.

J. Yan, T. Yeh, Y. Chang, Y. Wu, and K. Feng, "DSP Equalization-free Data Center Communication with High Dispersion Tolerant Optical Duobinary-PAM4 Signal," in Conference on Lasers and Electro-Optics, OSA Technical Digest (online) (Optical Society of America, 2017), paper SF1L.4.

Jafari, O. et al., "Mach-Zehnder silicon photonic modulator assisted by phase-shifted bragg gratings," Photon. Technol. Lett. 32, 445-448 (2020).

K. Yonenaga and S. Kuwano, "Dispersion-Tolerant Optical Transmission System Using Duobinary Transmitter and Binary Receiver," IEEE J. Lightwave Technol., vol. 15, No. 8, pp. 1530-1537, 1997.

Klein, H.N. et al. "1.55μm Mach-Zehnder Modulators on InP for Optical 40/80 Gbit/s Transmission Networks," In 2006 International

(56)        References Cited

OTHER PUBLICATIONS

Conference on Indium Phosphide and Related Materials Conference Proceedings, May 8, 2006, pp. 171-173, IEEE.

Lange, Sophie et al. "100 GBd Intensity Modulation and Direct Detection With an InP-Based Monolithic DFB Laser Mach-Zehnder Modulator," Journal of Lightwave Technology, vol. 36, No. 1, Jan. 1, 2018, pp. 97-102.

Lange, Sophie et al. "Low Switching Voltage Mach-Zehnder Modulator Monolithically Integrated With DFB Laser for Data Transmission up to 107.4 Gb/s," Journal of Lightwave Technology, vol. 34, No. 2, Jan. 15, 2016, pp. 401-406, DOI: 10.1109/JLT.2015.2496426.

Li, G.L. et al. "Analysis of Segmented Traveling-Wave Optical Modulators," Journal of Lightwave Technology, vol. 22, No. 7, Jul. 2004, pp. 1789-1796, DOI: 10.1109/JLT.2004.831179. Available online: URL: https://opg.optica.org/jlt/abstract.cfmuri=jlt-22-7-1789.

Li, G.L. et al. "Numerical Modeling of Segmented Traveling-Wave Electroabsorption Modulators," In 2004 IEE MTIT-S International Microwave Symposium Digest (IEEE Cat. No. 04CH37535), Jun. 6, 2004, vol. 2, pp. 773-776, IEEE.

Margalit, N. et al., "Perspectives on the future of silicon photonics and electronics," Appl. Phys. Lett. 118, 220501 (2021).

Nan Qi et al., Co-Design and Demonstration of a 25 Gbps Silicon-Photonic Mach Zehnder Modulator with a CMOS Based High Swing Driver, IEEE, Nov. 2016, pp. 1-11 (Year: 2016).

Ogiso, Yoshihiro et al. "Over 67 GHZ Bandwidth and 1.5 V Vp InP-Based Optical IQ Modulator With n-i-p-n Heterostructure," Journal of Lightwave Technology, vol. 35, No. 8, Apr. 15, 2017, pp. 1450-1455, DOI: 10.1109/JLT.2016.2639542.

Qian, Guang et al. "CL-TWE Mach-Zehnder Electro-Optic Modulator Based on InP-MQW Optical Waveguides," Chinese Optics Letters, vol. 17, No. 6, Jun. 2019, pp. 061301-1-061301-5, DOI: 10.3788/COL201917.061301.

Romero-Garcia, Sebastian et al., "High-speed resonantly enhanced silicon photonics modulator with a large operating temperature range", Optic Letters, vol. 42, Issue 1, pp. 81-84 (2017). https://doi.org/10.1364/OL.42.000081.

Sharif Azadeh, S. et al., "Low Vp silicon photonics modulators with highly linear epitaxially grown phase shifters," Opt. Expr. 23, 23526-23550 (2015).

Stepanenko, M. et al. "Optimization of RF Electrodes for Electro-Optic Modulator Based on Quantum-Confined Stark Effect," In Journal of Physics: Conference Series 2019, vol. 1145, No. 1:012028, pp. 1-6, IOP Publishing.

Stepanenko, Mikhail et al. "Multi-Parameter Optimization of an InP Electro-Optic Modulator," Symmetry, vol. 12, Nov. 21, 2020, pp. 1-18, DOI: 10.3390/sym12111920.

Terada, Y. et al., "Full C-band Si photonic crystal waveguide modulator," Opt. Lett. 42, 5110-5112 (2017).

U.S. Appl. No. 18/110,206, filed Feb. 15, 2023, entitled "System for In-Band Spectral Cross-Talk Monitoring".

Velthaus, K.-O. et al. "High Performance InP-Based Mach-Zehnder Modulators for 10 to 100 Gb/s Optical Fiber Transmission Systems," 23rd International Conference on Indium Phosphide and Related Materials—IPRM 2011, May 22-26, 2011, (4 pages), Berlin, Germany.

Wang, Gary et al. "Low Vp, High Bandwidth, Small Form Factor InP Modulator," in 2014 IEEE Avionics, Fiber-Optics and Photonics Technology Conference (AVFOP), Nov. 11, 2014, pp. 41-42, IEEE.

Witzens, J., "High-Speed silicon photonics modulators," Proc. IEEE 106, 2158-2182 (2017).

Yamazaki, Hiroshi et al. "IMDD Transmission at Net Data Rate of 333 Gb/s Using Over-100-GHz-Bandwidth Analog Multiplexer and Mach-Zehnder Modulator," Journal of Lightwave Technology, vol. 37, No. 8, Apr. 15, 2019, pp. 1772-1778, DOI: 10.1109/JLT.2019.2898675.

Han, C. et al., "Recent progress in silicon-based slow-light electro-optic modulators," Micromachines 13, 400 (2022).

Han, C. et al., "Ultra-compact silicon modulator with 110 GHz bandwith," in Proc. Opt. Fib. Comm. Conf. (OFC), (Optica Publishing Group, Washington, D.C. 2022), p. Th4C.5.

Horikawa, T. et al., "A 300-nm silicon photonics platform for large-scale device integration," J. Sel. Top. Quant. Electron, 24, 8200415 (2018).

Islam et al, "Very low input voltage cascaded travelling wave electroabsorption modulator (CTWEAM) for more than 100 Gbps," Optics Communications, vol. 297, pp. 43-47 (Year: 2013).

Li et al, "GeSi modulator based on two-mode interference," Applied Optics, vol. 53, No. 2, pp. 221-225 (Year: 2014).

Hasebe et al, "Push-pull driven electro-absorption modulator integrated with DFB laser using selectively doped lateral pin diode structure," IEEE International Semiconductor Laser Conference, pp. 54-55 (Year: 2014).

* cited by examiner

500

550

600

RECEIVING, FROM A LASER SOURCE, A CONTINUOUS WAVE (CW) LIGHT VIA AN OPTICAL WAVEGUIDE, WHEREIN THE OPTICAL WAVEGUIDE COMPRISES A SEGMENTED TRAVELING WAVE ELECTRODE (S-TWE) STRUCTURE COMPRISING ELECTRODE SEGMENTS DISPOSED THEREON, WHEREIN THE OPTICAL WAVEGUIDE COMPRISES ALTERNATING ACTIVE SECTIONS AND PASSIVE SECTIONS, WHEREIN EACH ELECTRODE SEGMENT IS DISPOSED ON A CORRESPONDING ACTIVE SECTION
702

RECEIVING, FROM A RADIO FREQUENCY (RF) SOURCE, AN ELECTRICAL SIGNAL HAVING A DRIVING VOLTAGE OF ABOUT 0.45V VIA AN ELECTRICAL TRANSMISSION LINE, WHEREIN THE ELECTRICAL TRANSMISSION LINE IS OPERATIVELY COUPLED TO THE ELECTRODE SEGMENTS VIA CONDUCTING BRIDGES
704

GENERATING, USING THE EAM DEVICE, AN OPTICAL OUTPUT SIGNAL BASED ON AT LEAST THE CW LIGHT
706

TRANSMITTING THE OPTICAL OUTPUT SIGNAL VIA THE OPTICAL WAVEGUIDE TO AN EXTERNAL CIRCUIT
708

FIGURE 7

LOW VOLTAGE TRAVELING WAVE ELECTRO-ABSORPTION MODULATOR FOR HIGH BANDWIDTH OPERATION

TECHNOLOGICAL FIELD

Example embodiments of the present disclosure relate to traveling wave electro-absorption modulators (TW-EAM) and, more particularly, to a low voltage TW-EAM design for high bandwidth operation.

BACKGROUND

Next generation optical links, such as XDR optical links and GDR optical links are often used in large networks, such as those in the telecommunications and financial industries, where the data needs to be transferred quickly and securely. Such optical links require optical modulators, such as Mach-Zehnder modulators (MZMs) and electro-absorption modulators (EAMs), that modulate an optical beam to encode data into the data stream. However, the 3 dB modulation bandwidth of conventional EAMs is significantly less than the high bandwidth requirement of XDR and GDR optical links.

Applicant has identified a number of deficiencies and problems associated with current designs of optical modulators for high bandwidth operation. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for low voltage traveling wave electro-absorption modulator (TW-EAM) for high bandwidth operation.

In one aspect, an electro-absorption modulator (EAM) device is presented. The EAM device comprises: an optical waveguide comprising a waveguide core configured to facilitate a propagation of an optical signal therethrough; a segmented traveling wave electrode structure comprising electrode segments disposed on the optical waveguide; and an electrical transmission line operatively coupled to the electrode segments via conducting bridges, wherein the electrical transmission line is configured to facilitate a propagation of an electrical signal therethrough, wherein the electrode segments are configured to overcome bandwidth and extinction ratio constraints of a lumped EAM.

In some embodiments, the optical waveguide comprises alternating active sections and passive sections.

In some embodiments, each electrode segment is disposed on a corresponding active section.

In some embodiments, the optical waveguide further comprises a continuous multi-quantum well (MQW) layer stack, wherein portions of the MQW layer stack disposed in the active sections have an energy gap defining an active energy gap value, and portions of the MQW layer stack disposed in the passive sections have an energy gap defining a passive energy gap value, wherein the passive energy gap value is greater than the active energy gap value to maintain low insertion loss.

In some embodiments, a length of each electrode segment is within a range of about 25 microns to about 90 microns, a width of the optical waveguide is within a range of about 0.8 microns to about 1.8 microns, a thickness of an intrinsic region of the optical waveguide is within a range of about 0.22 microns to about 0.35 microns, and an electrode filling factor associated with the EAM device is within a range of about 0.25 to about 0.5.

In some embodiments, a minimum number of active sections required to meet an extinction ratio requirement for optical link operation is 2.

In some embodiments, the EAM device meets a bandwidth requirement associated with XDR optical links or GDR optical links, wherein the bandwidth requirement of XDR optical links is 60 GHz, and the bandwidth requirement of GDR optical links is 120 GHz.

In some embodiments, the EAM device is monolithically integrated along with a laser source on a same chip.

In some embodiments, the EAM device is configured for operation by an RF source in a direct drive modulation mode, wherein the RF source is a Serializer-Deserializer (SerDes) transmitter.

In some embodiments, the optical waveguide comprises at least a ridge waveguide or a buried heterostructure (BH) waveguide.

In some embodiments, the electrode segments and the electrical transmission line are configured to provide velocity matching between the electrical signal and the optical signal.

In some embodiments, the electrical transmission line is a microstrip transmission line.

In some embodiments, the electrical transmission line has a width within a range of about 3 microns to about 10 microns and a thickness within a range of about 1.0 microns to about 3 microns; an insulating spacer layer associated with the electrical transmission line, wherein the insulating spacer layer has a thickness within a range of about 4.5 microns to about 7 microns; and a resulting unloaded electrical transmission line impedance within a range of about 60Ω to about 130Ω.

In another aspect, an electro-absorption modulator (EAM) device is presented. The EAM device comprises an optical waveguide comprising alternating active sections and passive sections, wherein the optical waveguide is configured to facilitate a propagation of an optical signal therethrough; a segmented traveling wave electrode structure comprising electrode segments disposed on the waveguide; and an electrical transmission line operatively coupled to the electrode segments via conducting bridges, wherein the electrical transmission line is configured to facilitate a propagation of an electrical signal therethrough, wherein the EAM device is configured for operation by an RF source in a direct drive modulation mode, wherein the RF source is a Serializer-Deserializer (SerDes) transmitter that is configured to supply the electrical signal at a driving voltage of 0.45V.

In yet another aspect, a method of generating an optical output signal using an electro-absorption modulator (EAM) device is presented. The method comprises: receiving, from a laser source, a continuous wave (CW) light via an optical waveguide, wherein the optical waveguide comprises a segmented traveling wave (S-TW) electrode structure comprising electrode segments disposed thereon, wherein the optical waveguide comprises alternating active sections and passive sections, wherein each electrode segment is disposed on a corresponding active section; receiving, from a radio frequency (RF) source, an electrical signal having a driving voltage of about 0.45V via an electrical transmission line, wherein the electrical transmission line is operatively coupled to the electrode segments via conducting bridges; generating, using the EAM device, an optical output signal based on at least the CW light; and transmitting the optical output signal via the optical waveguide to an external circuit.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made to the accompanying drawings. The components illustrated in the figures may or may not be present in certain embodiments described herein. Some embodiments may include fewer (or more) components than those shown in the figures.

Figure 1:
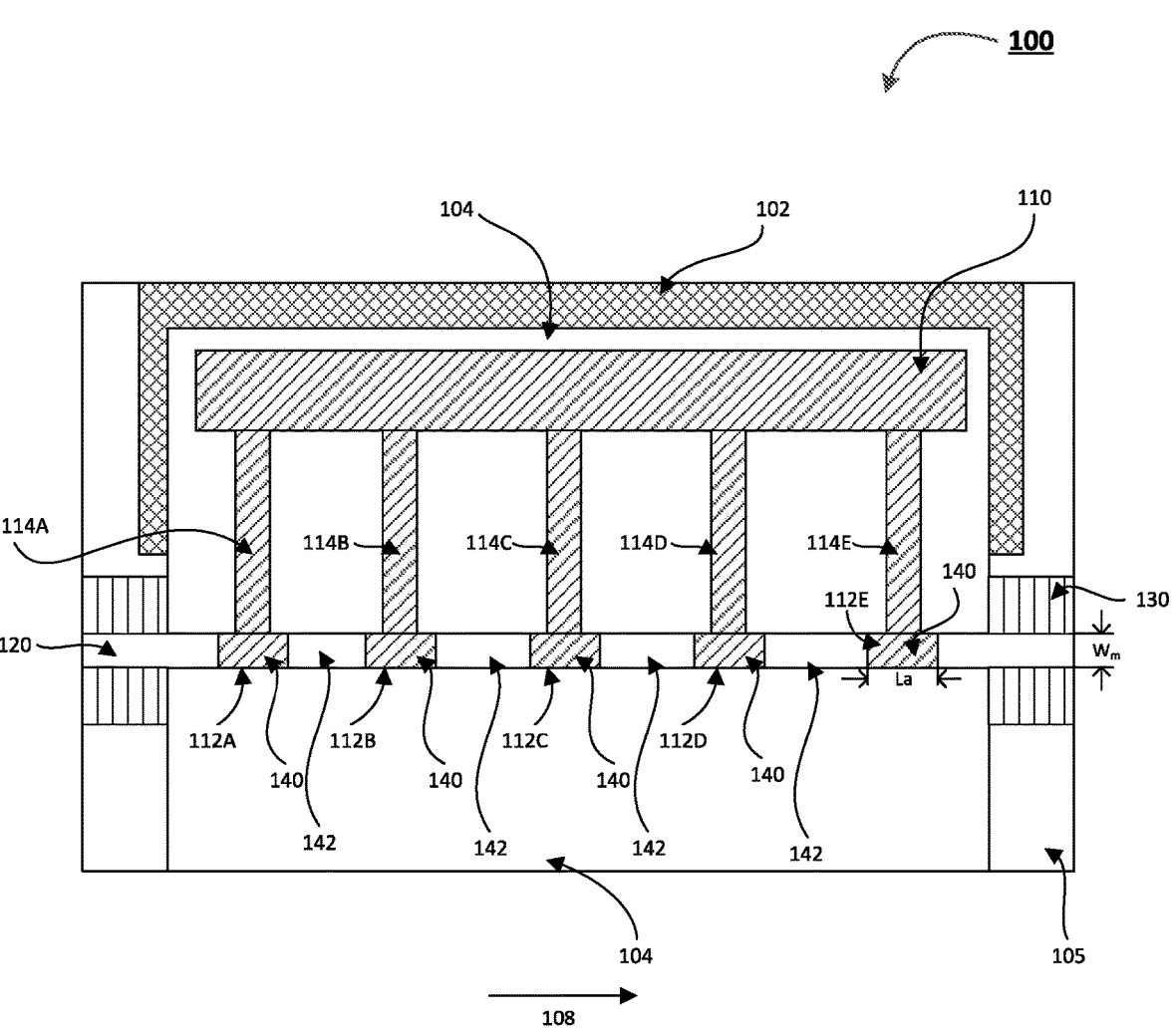
Figure 2:
Figure 2:
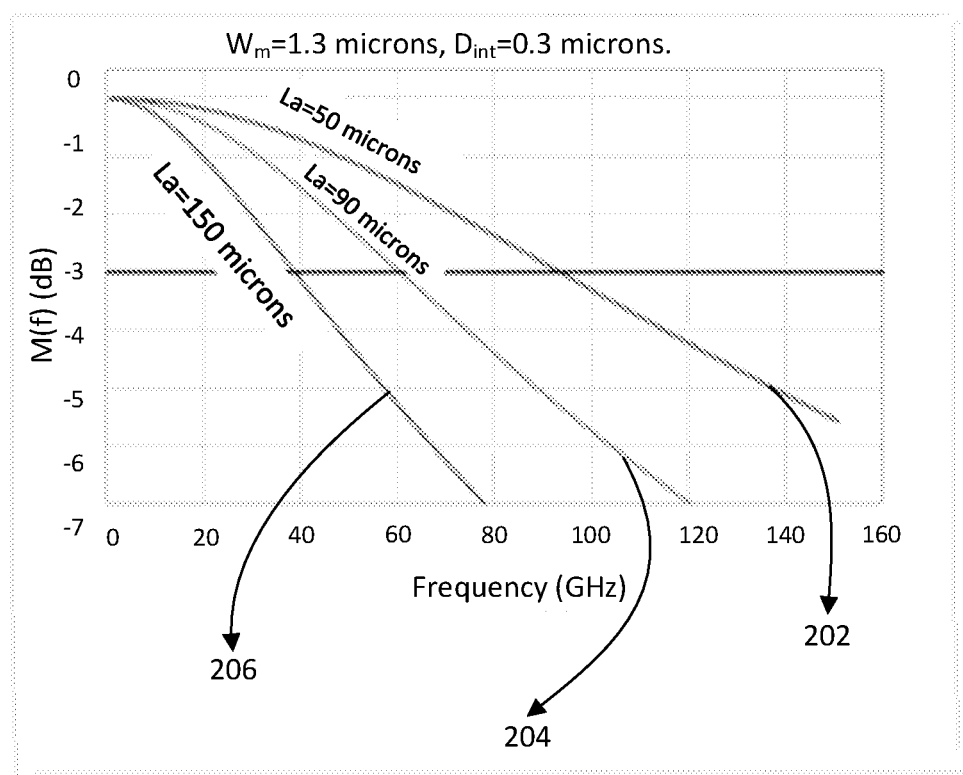
Figure 3A:
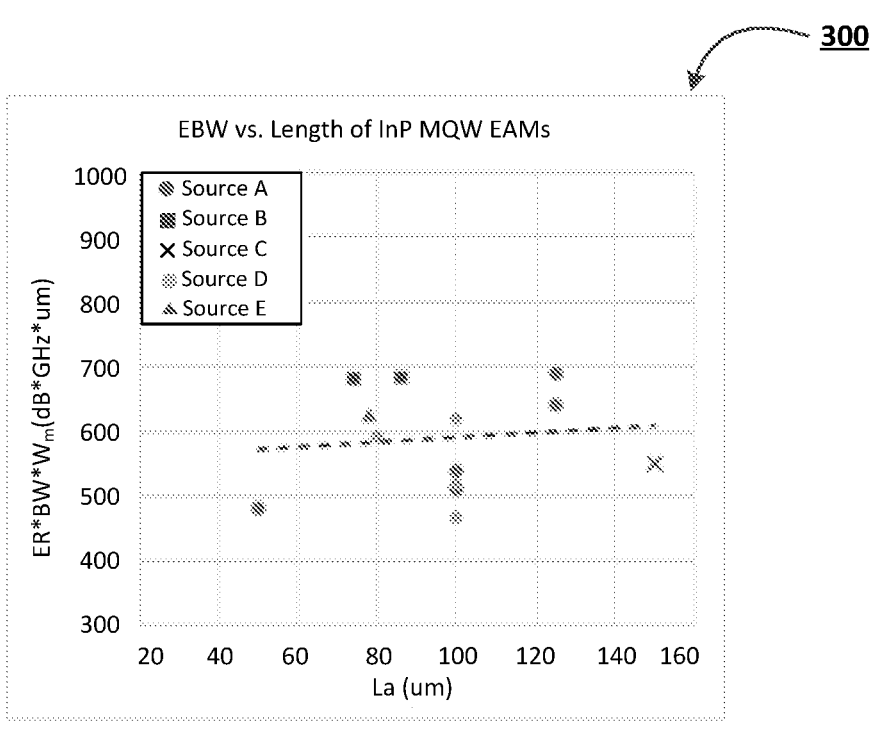
Figure 3B:
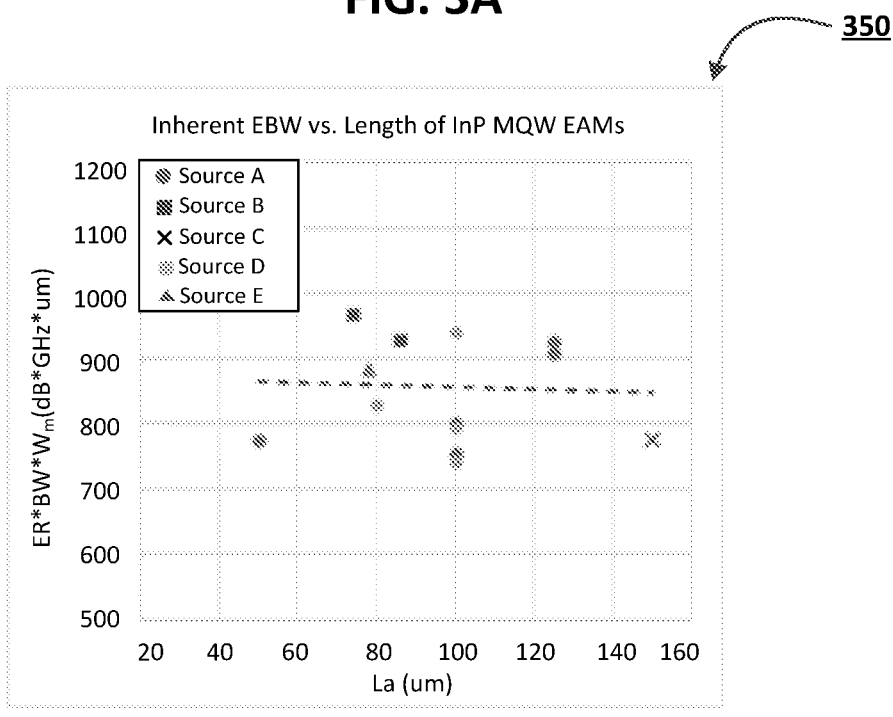
Figure 4A:
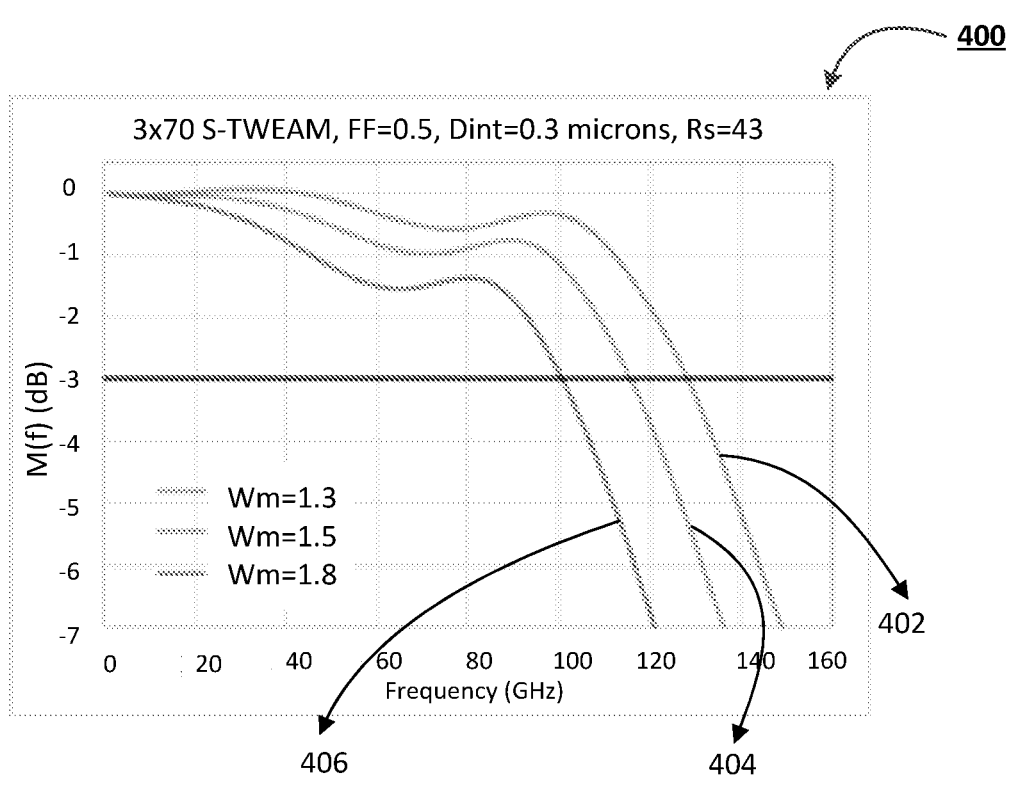
Figure 4B:
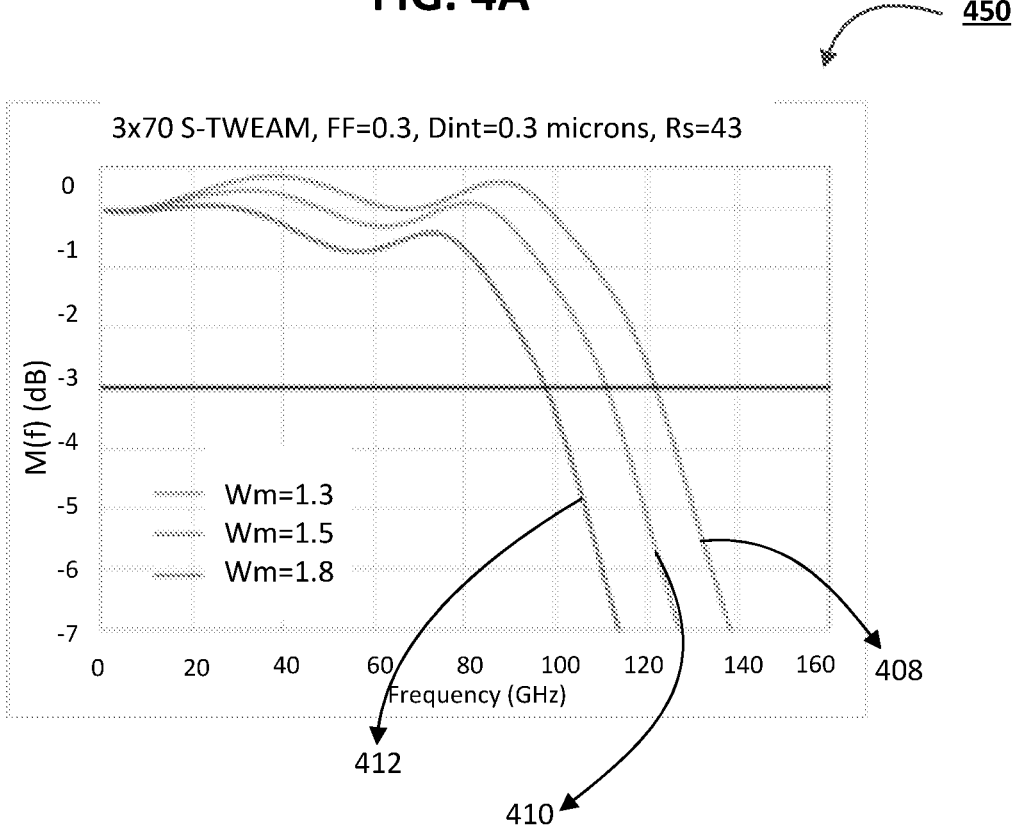
Figure 5A:
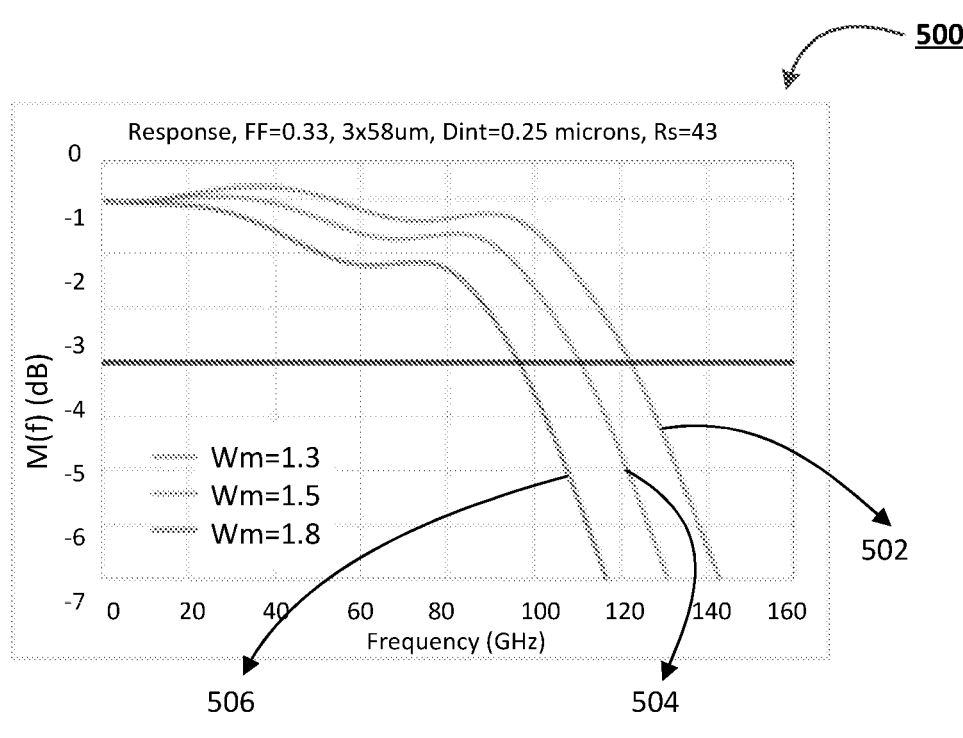
Figure 5B:
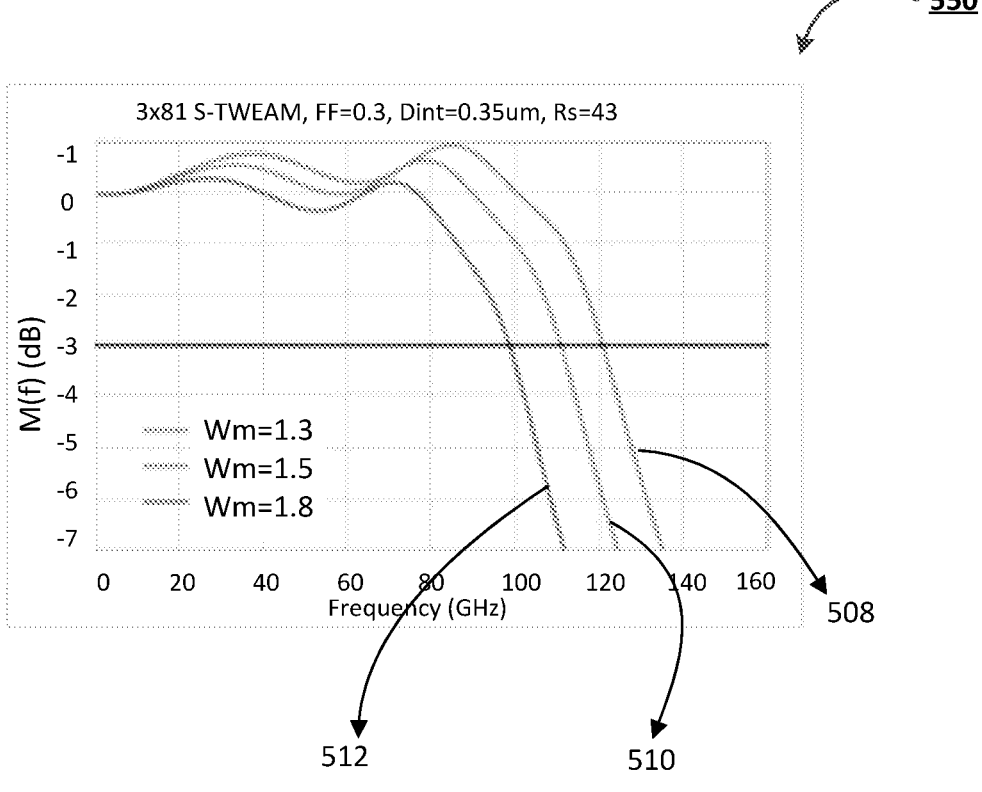
Figure 6:
Figure 6:
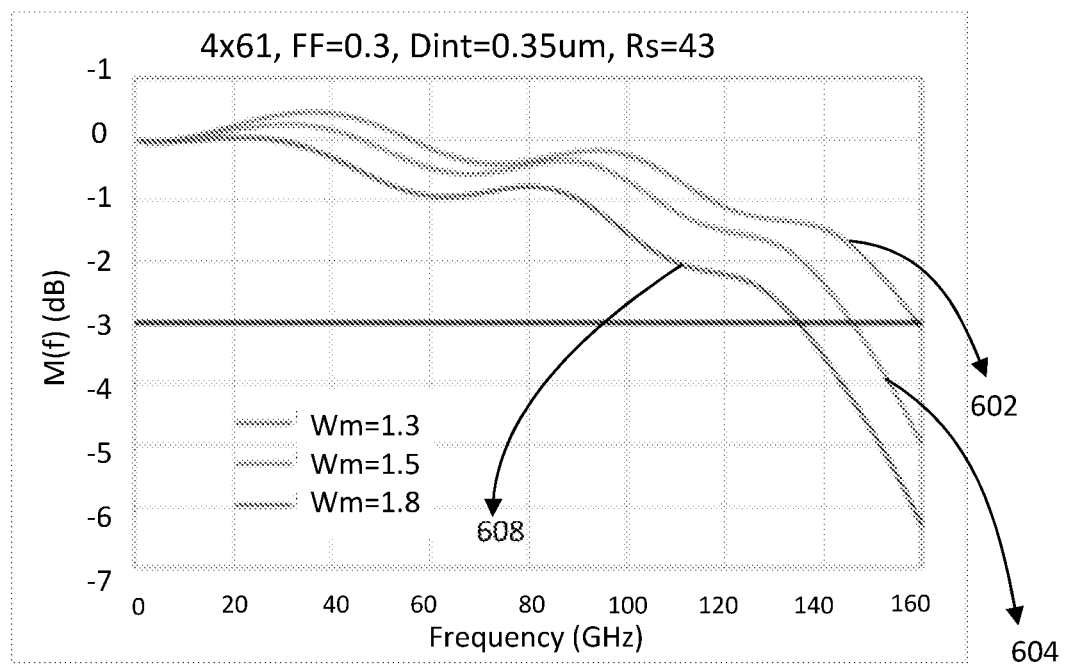

FIG. 1 illustrates a top view of an example segmented traveling wave electro-absorption modulator (S-TWEAM) device, in accordance with an embodiment of the invention;

FIG. 2 illustrates frequency response curves of EAM device designs with various electrode lengths, La, in accordance with an embodiment of the invention;

FIG. 3A illustrates empirical EBw values of InP EAMs from various sources, in accordance with an embodiment of the invention;

FIG. 3B illustrates inherent EBw values of InP EAMs from various sources, in accordance with an embodiment of the invention;

FIG. 4A illustrates frequency response curves of S-TWEAM device designs with a filling factor, FF=0.5, and various optical waveguide widths, $W_m$, in accordance with an embodiment of the invention;

FIG. 4B illustrates frequency response curves of S-TWEAM device designs with a filling factor, FF=0.33, and various optical waveguide widths, $W_m$, in accordance with an embodiment of the invention;

FIG. 5A illustrates frequency response curves of S-TWEAM device designs with an intrinsic region thickness, $D_{int}$=0.25 microns, and various optical waveguide widths, $W_m$, in accordance with an embodiment of the invention;

FIG. 5B illustrates frequency response curves of S-TWEAM device designs with an intrinsic region thickness, $D_{int}$=0.25 microns, and various optical waveguide widths, $W_m$, in accordance with an embodiment of the invention;

FIG. 6 illustrates frequency response curves of S-TWEAM device designs with various optical waveguide widths, $W_m$, for high bandwidth operations, in accordance with an embodiment of the invention; and FIG. 7 illustrates a method for generating an optical output signal using a segmented traveling wave electro-absorption modulator (S-TWEAM) device 700, in accordance with an embodiment of the invention.

DETAILED DESCRIPTION

Overview

Next generation optical links, such as XDR optical links and GDR optical links, are often used in large networks, where the data needs to be transferred quickly and securely. XDR optical links require optical modulators capable of operating at 60 GHz, while GDR optical links require optical modulators capable of operating at 120 GHz. Such high bandwidth requirements are beyond the reach of currently used vertical-cavity surface-emitting laser (VCSEL) optical sources. However, laser-modulator integrated chips, such as Indium Phosphide (InP) based externally modulated lasers (EMLs) integrated with electro-absorption modulators (EAMs), may be used to achieve the bandwidth requirements of these next generation optical links. Optical modulation in EMLs may be induced by an electrical signal supplied by a radio frequency (RF) source to an electrode that is disposed on the waveguide. The geometry of the electrodes, e.g., electrode length, may be a key factor in determining the operational properties of the optical modulator. These operational properties may include bandwidth, extinction ratio, driving voltage, and power consumption.

In some embodiments, optical modulation in EMLs is induced when an electrical signal is applied to a single electrode placed on top of an optical waveguide. Such devices are typically referred to as lumped electro absorption modulators (L-EAM). To obtain a high bandwidth in such EMLs, the length of the electrode is usually shortened. For example, to meet a bandwidth requirement of 60 GHz, L-EAMs are typically designed to have an electrode length that is less than 85 microns. However, another important consideration when designing the electrode is extinction ratio. Bandwidth and extinction ratio have an opposing dependence on the electrode length. Said differently, while reducing the electrode length may result in achieving higher bandwidth, it may also limit the extinction ratio obtainable at a certain driving voltage to a value that is lower than what is needed for practical link operation (e.g., dynamic extinction ratio of around 4 dB). The dynamic extinction ratio dictates the required driving voltage from the RF source and, as a consequence, affects the overall power efficiency of the overall transmitter unit (e.g., EML+RF). Power efficiency, availability, and cost of RF sources and drivers are important factors influencing optical link designs for large networks, which employ a number of such electronic devices. In general, the lower the required driving voltage for the modulator, the simpler, more efficient, and less expensive the RF source can be.

An RF source that is of major importance in data centers is the Serializer-Deserializer (SerDes) transmitter. Nowadays, for an optical link, the SerDes transmitter is typically combined with an external driving circuit to provide the required voltage swing. SerDes transmitters, developed originally for copper cables, are able to supply a single-ended driving voltage of around 0.45V at the required frequencies (e.g., 60 GHz). However, to achieve the requisite dynamic extinction ratio (e.g., around 4 dB), conventional EAMs require a driving voltage of around 1V. Such a constraint excludes the use of SerDes transmitters in a direct modulation mode. Therefore, there is a need for a novel design of a TW-EAM that addresses (e.g., removes) the dependence of bandwidth and extinction ratio on electrode geometry to enable the use of SerDes transmitters to drive the EAM in direct modulation mode.

Accordingly, embodiments of the invention allow the EAM device to operate at high bandwidths (e.g., 60 GHz and 120 GHz) and also be driven at a low driving voltage (around 0.45V) in a direct drive modulation mode. Moreover, the novel design require only minor modifications to the semiconductor layer design or optical waveguide geometry with respect to existing EAM devices. To this end, the EAM device may include an optical waveguide, a segmented traveling wave (S-TW) electrode structure disposed on the optical waveguide, and an electrical transmission line (e.g., microstrip transmission line). The optical waveguide may include a continuous multi-quantum well (MQW) layer stack with alternating active and passive sections. The S-TWE structure may include electrode segments that are disposed on the optical waveguide in such a way that each electrode segment is disposed on a corresponding active section. By designing the geometry of the electrodes in a particular way, embodiments of the present invention remove the dependence of bandwidth and extinction ratio on the electrode length. The bandwidth of the EAM may be dictated by the length of the individual electrode segments in the multi-segment row. The aggregated active length of multiple electrodes has only a minor bearing on the bandwidth. However, extinction ratio is determined by the accumulative absorption of the entire row of electrode segments. Therefore, proper electrode geometry design will allow for high bandwidth (e.g., 60 GHz and 120 GHz) operations at low driving voltage from an RF source (e.g., SerDes transmitter) of around 0.45V, while still meeting the minimum dynamic extinction requirement of around 4 dB. As such, in example embodiments, a length of each electrode segment is less than 50 microns for EAM devices with a GDR bandwidth requirement (e.g., 120 GHz) and up to 90 microns for EAM devices with an XDR bandwidth requirement (e.g., 60 GHz), a width of the optical waveguide is within a range of about 0.8 microns to about 1.8 microns, a thickness of an intrinsic region of the optical waveguide is within a range of about 0.22 microns to about 0.35 microns, and an electrode filling factor associated with the EAM device is within a range of about 0.25 to about 0.5. Accordingly, in some example embodiments, a minimum number of active sections needed to meet the extinction ratio requirement for optical link operation is 2.

The various processes, procedures, and/or operations for fabricating embodiments of an EAM device such as that described herein are disclosed in application Ser. No. 17/810,068, titled, "HIGH BANDWIDTH TRAVELLING WAVE ELECTRO ABSORPTION MODULATOR (EAM) CHIP," the contents of which are incorporated herein by reference.

Embodiments of the present invention will now be described more fully hereinafter with reference to the accompanying drawings, in which some, but not all, embodiments are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, terms such as "top," "about," "around," etc. are used for explanatory purposes in the examples provided below to describe the relative position of certain components or portions of components.

As used herein, the terms "substantially" and "approximately" refer to tolerances within appropriate manufacturing and/or engineering standards.

As used herein, "operatively coupled" may mean that the components are electrically coupled and/or are in or are capable of electrical communication with one another, or optically coupled and/or are in or are capable of optical communication with one another. Furthermore, "operatively coupled" may mean that the components may be formed integrally with each other or may be formed separately and coupled together. Furthermore, "operatively coupled" may mean that the components may be directly connected to each other or may be connected to each other with one or more components (e.g., connectors) located between the components that are operatively coupled together. Furthermore, "operatively coupled" may mean that the components are detachable from each other or that they are permanently coupled together.

Example EAM Device

FIG. 1 illustrates a top view of an example segmented traveling wave electro-absorption modulator (S-TWEAM) device 100, in accordance with an embodiment of the invention. The S-TWEAM device 100 may include an optical waveguide 120 formed at least in part on a substrate 105. In some embodiments, the optical waveguide 120 may include a ridge waveguide, a buried heterostructure (BH) waveguide, and/or the like. As shown in FIG. 1, the optical waveguide 120 extends lengthwise in a modulator propagation direction 108 and has a width $W_m$ in a direction substantially perpendicular to the propagation direction 108. In an example embodiment, the S-TWEAM device 100 is monolithically integrated along with a laser source (not shown) on a same chip.

The optical waveguide 120 may include a continuous multiple quantum well (MQW) layer stack formed using a single epitaxial growth process to prevent any butt joints or other discontinuities therein. In some embodiments, the MQW layer stack may be configured to transmit and/or propagate an optical beam and/or signal (e.g., continuous wave (CW) light) therethrough. For example, in various embodiments, the MQW layer stack may be configured to act as the waveguide core of the optical waveguide 120. The MQW layer stack may include a plurality of quantum wells. For example, the MQW layer stack may include a series of quantum wells disposed between a series of (quantum) barriers. In some embodiments, the multi-quantum well and/or dots layers may be configured to propagate light and/or an optical beam or signal in the propagation direction 108. The multi-quantum well and/or dots layers may be formed from GaAs- or InP-based semiconductor materials. For example, in various embodiments, the MQW layer stack may include GaAs- and/or InP-based semiconductor materials. In an example embodiment, the MQW layer stack may include III-V semiconductor materials (e.g., AlGaAs; InGaAsP; group IV materials such as, for example, Si, Ge, SiGe, one or more Si—SiGe compositions, and/or the like).

In example embodiments, the MWQ layer stack may be formed in such a way that the optical waveguide 120 may include alternating active sections 140 and passive sections 142. Here, the modulation of the optical signal primarily occurs in the active sections 140. The portions of the MQW layer stack in the active sections 140 may have an energy gap (e.g., between the conduction band and the valence band of the MQW layer material) defining an active energy gap value. Similarly, the portions of the MQW layer stack in the passive sections 142 may have an energy gap (e.g., between the conduction band and the valence band of the MQW layer material) defining a passive energy gap value. In some embodiments, to maintain low insertion loss, the passive energy gap value may be greater than the active energy gap value.

In some embodiments, the formation of a continuous MQW layer stack formed in a single epitaxial growth process and having different energy gaps between the conduction band and valence band in different portions of the continuous MQW layer stack is achieved by adding a quantum well intermixing (QWI) process to the device fabrication process. The QWI process is implemented by an ion implantation step followed by a rapid thermal annealing (RTA) step, which causes a blue shift of the MQW bandgap in the implanted MQW regions. Selective implantation in the passive portions 142 can thus substantially reduce the waveguide absorption factor in passive portions 142, leading to a highly reduced absorption loss. Additional methods that can be used to shift the bandgap energy via quantum well intermixing similarly to ion implantation include proton bombardment, RF plasma induction and pulse laser surface treatments. Sufficient increase of the energy gap in the passive WG sections enables to obtain EAM devices with low filling factors, FFs, of 0.5 or less exhibit insertion losses that are similar to those observed in FF=1, or continuous electrode devices having electrode lengths similar to the combined electrode length of the S-TWEAM device 100. Thus, various embodiments enable the use of low FFs to enable increased bandwidth while achieving low insertion loss. In various embodiments, the use of a QWI process is valid to both the III-V material quantum wells and to the SiGe system materials, which are used in Si-photonics platforms.

In some other embodiments, the formation of a continuous MQW layer stack formed in a single epitaxial growth process and having different energy gaps between the conduction band and valence band in different portions of the continuous MQW layer stack is achieved through the use of a selective area growth (SAG) mask for epi-growth of the active portions 140 of the continuous MQW layer stack. The SAG method is implemented by the implementation of a proper SiO2 mask in the vicinity of the active portions 140, which leads to a red shift of the MQW bandgap in the active portions 140 of the continuous MQW layer stack. Thus, a continuous MQW layer with different bandgaps at different wafer locations can be tailored in a single epitaxial growth process. For example, in various embodiments, the continuous MQW layer may have different bandgaps at different locations along the length of the continuous MQW layer stack. For example, in various embodiments, the S-TWEAM device 100 may include a continuous MQW layer stack that is formed through a single epitaxial growth process such that the continuous MQW layer stack of the S-TWEAM device 100 has different bandgaps at different locations along the length of the continuous MQW layer stack.

High performance EAMs in both III-V and SiGe material systems are based on Quantum Confined Stark Effect (QCSE). QCSE is a phenomenon in which the electrical properties of a semiconductor are affected by an external electric field. In such devices, the optical signal is modulated by an electrical signal induced by an RF source into the core of the optical waveguide 120, causing changes in the optical power of the optical signal propagating therethrough. The electrical signal is induced in an intrinsic volume surrounding the p-n junction of the optical modulator, which is maintained under a reverse-bias voltage. The intrinsic region of the optical waveguide 120 has a thickness $D_{int}$ that is formed by low doping of the semiconductor in the MQW layers and some of the other surrounding layers. As described herein, the primary requirements of the S-TWEAM device 100 may include bandwidth (BW) and extinction ratio (ER), driving voltage ($V_{pp}$), and/or power consumption. The overall design of the device layer structure and the geometry of the waveguide and electrode may be key factors in designing optical modulators to meet the primary requirements.

In some embodiments, to achieve high bandwidth (e.g., 60 GHz), optical waveguides (e.g., optical waveguide 120) in EAM devices may be designed with a minimal $W_m$ as much as process technology permits. Reducing $W_m$ any further may result in lower wafer yields and operational challenges. In addition, reducing $W_m$ further may cause waveguide propagation losses due to an increased ratio between the waveguide wall roughness and $W_m$. As such, in some example embodiments, the optical waveguide 120 may have $W_m$ that is within a range of about 0.8 microns to about 1.8 microns, and $D_{int}$ within a range of about 0.22 microns to about 0.35 microns, while achieving high bandwidths, as shown in FIGS. 4A-4B, 5A-5B, and 6.

As shown in FIG. 1, in some embodiments, the S-TWEAM device 100 may include a segmented traveling wave (S-TW) electrode structure that has a number of electrode segments 112 (e.g., 112A, 112B, 112C, 112D, 112E) disposed on the active section 140 of the optical waveguide 120 with FF that is within a range of about 0.25 to 0.5. FF may refer to a measure of how densely the active area of a waveguide is filled with active components (e.g., electrode segments 112). Each electrode segment 112 may be in electrical communication with an electrical transmission line 110 via a corresponding conducting bridge 114 (e.g., 114A, 114B, 114C, 114D, 114E). For example, electrode segment 112A may be in electrical communication with the electrical transmission line 110 via conducting bridge 114A, electrode segment 112B may be in electrical communication with the electrical transmission line 110 via conducting bridge 114B, electrode segment 112C may be in electrical communication with the electrical transmission line 110 via conducting bridge 114C, electrode segment 112D may be in electrical communication with the electrical transmission line 110 via conducting bridge 114D, and electrode segment 112E may be in electrical communication with the electrical transmission line 110 via conducting bridge 114E. In some embodiments, each electrode segment 112 may have an electrode length La that is substantially equal to a length of the corresponding active section 140. In some embodiments, La of each electrode segment may be equal. In some other embodiments, La of each electrode segment may not be equal. Also, in some embodiments, each electrode segment 112 may have a width that is substantially equal to $W_m$. In some other embodiments, each electrode segment 112 may have a width that is larger than $W_m$. In still other embodiments, each electrode segment 112 may have a width that is narrower than $W_m$.

Most optical modulators use a lumped element electro-absorption modulation (L-EAM) electrode configuration. In example embodiments, the primary geometric design parameters that determine the BW and ER of the L-EAMs are La, $W_m$, and $D_{int}$. The bandwidth of the L-EAMs is limited by the product of the RF source and/or driver impedance and the optical waveguide capacitance (Cm). Cm is linearly dependent on La, $W_m$, and reciprocally on $D_{int}$. Thus, the 3 dB modulation bandwidth is proportional to $BW \sim D_{int}/(La*W_m)$. As such, any reduction in $W_m$ will lead to an increase in BW. However, below a certain width (e.g., 1.2 microns), any additional BW reduction will result in an increase in waveguide loss and reduced optical confinement in narrow waveguides. For example, when designing optical modulators to meet XDR BW requirements of 60 GHz, the electrode must have a length, La, that is less than 85 microns, as shown in FIG. 2. However, BW and ER have opposing dependencies on La. While reducing the La may result in meeting the high bandwidth requirement, it also limits the ER obtainable at a certain $V_{pp}$, and as a consequence reduces the dynamic ER to a value that is lower than what is needed for practical link operation (e.g., 4 dB). In example embodiments, each electrode segment may have an La that is within a range of about 25 microns to about 90 microns.

In some embodiments, the electrical transmission line 110 may have a microstrip geometry. As shown in FIG. 1, the electrical transmission line 110 may have a conducting line of width W and thickness t, and may be disposed on an insulating spacer layer 104 that has a thickness h. The insulating spacer layer 104 may be made of benzocyclobutene (BCB) or other suitable insulating materials. The insulating spacer layer 104 may be disposed on a ground conducting layer 102. In some embodiments, the ground conducting layer 102 may be wider (in a direction substantially perpendicular to the propagation direction 108) than the electrical transmission line 110. As shown in FIG. 1, the electrical transmission line 110 may be operatively coupled to the electrode segments 112 disposed on a surface of the optical waveguide 120 via conducting bridges 114 disposed on the insulating spacer layer 104. In some embodiments, the electrical transmission line 110 may be designed to provide velocity matching between the electrical signal propagating through the electrical transmission line 110 and the optical signal propagating through the optical waveguide 120.

In some embodiments, to determine the design parameters (e.g., microstrip geometry) of the electrical transmission line 110, first, the width W of the electrical transmission line 110, the thickness t of the electrical transmission line 110, and the thickness h of the insulating spacer layer 104 are determined based on a desired unloaded line impedance (Zu) of the microstrip electrical transmission line 110. In example embodiments, Zu in practical microstrip-based electrical transmission lines (e.g., electrical transmission line 110) may be around 90Ω. To obtain a Zu of around 90Ω, in some example embodiments, a typical microstrip electrical transmission line 110 design may have a W that is within a range of about 3 microns to about 10 microns, a t within a range of about 1.0 microns to about 3 microns, and an h within a range of about 4.5 microns to about 7 microns. Having determined the initial design parameters to meet a Zu of around 90Ω, an unloaded line per-length inductance (Lu) may be determined. Here, the microstrip electrical transmission line 110 design parameters may be adjusted until Lu matches a refractive index $n_{op}$ of the optical waveguide by using the relation, $Lu=n_{op}*Zo/c$, where Zo may refer to an impedance of the EAM device (e.g., 43Ω) and c may refer to the speed of light. After determining Lu, the unloaded line impedance (Zu) of the microstrip electrical transmission line 110 and a corresponding refractive index $n_u$ thereof may be determined. The ratio of W/h may be tuned until the product, $Zu*n_u$, is substantially equal to $Zo*n_{op}$. Then, a specific capacitance per length (Cu) of the unloaded microstrip transmission line 110 may be determined using $Cu=Lu/Zu^2$. Having determined Cu, the capacitive loading (CL) of the electrical transmission line 110 by the segmented electrodes 112 may then be determined. In some embodiments, CL of the electrical transmission line 110 by the segmented electrodes 112 may be determined by the expression, $CL=(n_{op}^2-$ $n_u^2)/(Cu*Zo*n_o)$. Once CL is determined, the loaded line impedance (ZL) of the microstrip electrical transmission line 110 may be determined, and subsequently evaluated for compliance. ZL may be determined by the expression, $ZL=(Lu/(CL+Cu))^{0.5}$. In an example embodiment, a useful guideline for capacitive loading of the microstrip electrical transmission line 110 to allow for velocity matching between the electrical signal propagating through the electrical transmission line 110 and the optical signal propagating through the optical waveguide 120 is to substantially match ZL with a source impedance (Zs). As described in detail herein, Zs for the RF source implemented in embodiments of the EAM design may be substantially equal to 43Ω. In some embodiments, the resulting design parameters, W, t, and h, of the microstrip electrical transmission line 110 may be adjusted to ensure that ZL substantially matches Zs.

In various embodiments, the electrode segments 112, the electrical transmission line 110, and the respective conducting bridges 114 may be formed of metal (e.g., gold, copper, and/or the like) and/or another electrically conductive material.

In some embodiments, the electrical transmission line 110 may be operatively coupled to a radio frequency (RF) source that may be configured to supply an electrical signal (e.g., an output of a radio and/or microwave frequency system) to the S-TWEAM device 100. The RF source may be part of and/or controlled by a controller for the optical link and/or other structure, arrangement, and/or system comprising the S-TWEAM device 100. For example, the RF source may be a signal generator (e.g., a digital/analog convertor (DAC)), arbitrary waveform generator (AWG), local oscillator, and/or the like that is configured to generate and/or provide a radio and/or microwave frequency electric signal. In some embodiments, the RF source may be a Serializer-Deserializer (SerDes) transmitter. In example embodiments, the SerDes transmitter may be configured to provide an electrical signal that has $V_{pp}$ that is substantially equal to 0.45V and a source impedance, Zs that is substantially equal to 43Ω. As such, the electrical signal supplied by the RF source may be efficiently provided to the electrode segments 112 via the electrical transmission line 110. To this end, the electrical transmission line 110 may be configured to have low resistance to reduce the amount of heat generated as the electrical signal propagates therethrough and to maintain the integrity of (e.g., limit the noise introduced into) the electrical signal during propagation.

Furthermore, the power efficiency, availability, and cost of RF sources and/or drivers are important factors influencing optical modulator designs for large networks, which employ a number of such electronic devices. In general, the lower the required $V_{pp}$, the simpler, more efficient, and less expensive the RF driver can be. RF sources such as SerDes transmitters, developed originally for copper cables, are able to supply a $V_{pp}$ around 0.45V at the required XDR and GDR frequencies (e.g., 60 GHz and 120 GHz). Practical optical link operation requires a dynamic ER value that is around 4 dB. To meet the requisite dynamic ER value for XDR and GDR optical links, current EAMs require a minimum $V_{pp}$ of around 1V, as described in more detail in FIGS. 3A and 3B. As SerDes transmitters are restricted to a $V_{pp}$ of around 0.45V, power consuming electronic elements (e.g., external driving circuits) are coupled to the SerDes transmitters to increase the $V_{pp}$ to the required operational range of around 1V (e.g., 1.2V). Such a constraint excludes the use of SerDes transmitters in a "direct-drive" modulation mode.

By designing the electrode geometry according to the described embodiments herein, the dependence of BW and ER on the overall geometry of the electrodes (e.g., La) may be removed. As described in further detail herein, while the aggregated active length of multiple electrodes has only a minor bearing on the BW, ER is determined by the accumulative absorption of the entire row of electrode segments. Therefore, proper electrode geometry design with 25 microns≤La≤90 microns, 0.8 microns≤$W_m$≤1.8 microns, 0.22 microns≤$D_{int}$≤0.35 microns, and 0.25≤FF≤0.5, will allow for high BW (e.g., 60 GHz and 120 GHz) and direct modulation from the RF source at a $V_{pp}$ of around 0.45 V, while still meeting the dynamic ER requirement of around 4 dB, as shown in FIGS. 4A, 4B, 5A, 5B, and 6 below. Once the geometry of each electrode segment is determined, the total active length of the electrode may be determined by n*La, where n is the number of electrode segments and La is the length of each electrode segment. As dynamic ER of the multi-section phase matched device is the arithmetic sum (in dB) of individual electrode segments, the dynamic ER of the multi-section phase may be determined as a product of the dynamic ER of an electrode segment and the number of electrode segments (n). In some example embodiments, a minimum number of active sections required to meet the extinction ratio requirement for optical link operation is 2.

FIG. 2 illustrates frequency response curves 200 of EAM device designs with various electrode lengths, La, in accordance with an embodiment of the invention. Specifically, frequency response curves of EAM devices, EAM 1, EAM 2, and EAM 3 are illustrated in FIG. 2. EAM 1, EAM 2, and EAM 3 are designed to have $W_m$=1.3 microns, and $D_{int}$=0.3 microns. EAM 1 is designed to have La=150 microns, EAM 2 is designed to have La=90 microns, and EAM 3 is designed to have La=50 microns. As shown in FIG. 2, EAM 1 has a frequency response curve 202, EAM 2 has a frequency response curve 204, and EAM 3 has a frequency response curve 206. As seen from the frequency response curves 202, 204, and 206 illustrated in FIG. 2, when designing EAM devices to meet XDR BW requirements of 60 GHz, the electrode must have a length, La, that is less than 90 microns even when using an optical waveguide having a narrow width, $W_m$=1.3 microns.

FIG. 3A illustrates empirical EBw values of InP EAMs from various sources 300, in accordance with an embodiment of the invention. FIG. 3B illustrates inherent EBw values of InP EAMs from various sources 350, in accordance with an embodiment of the invention. In some embodiments, dynamic ER slope is directly proportional to La and inversely proportional to $D_{int}$, e.g., dynamic ERS-La/$D_{int}$. Bandwidth, on the other hand, is directly proportional to $D_{int}$ and inversely proportional to La and $W_m$, e.g., BW~$D_{int}$/(La*$W_m$). Due to the opposing dependencies of ERS and BW on La and $D_{int}$, the product of ERS, BW, and $W_m$, (hereinafter referred to as EBw) when designing EAM devices, must be independent of the geometric design factors La and $D_{int}$. Each EAM device may have an EBw value that may be evaluated based on the EAM device performance. Consequently, the EBw value may be used as a figure of merit to compare design quality of various EAM devices whose individual layer structure design details may not be previously known, from various original equipment manufacturers (OEMs), e.g., sources. Furthermore, EBw values may be used to estimate the obtainable ERS in EAMs and associated minimum voltage drive requirement.

FIG. 3A illustrates EBw values, e.g., empirical EBw values, of InP EAM devices from various OEMs, e.g., Source A, Source B, Source C, Source D, and Source E. As seen in FIG. 3A, each EAM device has an EBw value that has a weak dependence on La, the average value of which is illustrated as a dotted line in FIG. 3A. This is due to the effect of parasitic pad capacitance on the bandwidth, which is more prominent in EAM devices with shorter La. FIG. 3B illustrates EBw values, e.g., inherent EBw values, of InP EAM devices from various OEMs, e.g., Source A, Source B, Source C, Source D, and Source E, after removing the effect of parasitic pad capacitance on bandwidth. As evident from FIGS. 3A and 3B, despite the use of various materials and designs, the EAM devices from the various sources have little variation in the EBw values, and their dependence on the internal chip design (e.g., composition, thickness, number of quantum wells, doping, and/or the like) are insignificant. The inherent EBw values of the EAM devices from high-end sources are in the range of about 800 dB*GHz*μm to about 940 dB*GHz*μm. As such, in some embodiments, for numerical evaluation of dynamic ER of L-EAMs having different La, an inherent EBw value of 870 dB*GHz*μm is assumed.

With an empirical EBw value of 870 dB*GHz*μm, the static ERS value for EAM designs described in FIG. 2, specifically, EAM 1, EAM 2, and EAM 3 may be determined using, static ERS(La)=EBw/BW(La)*Wm. As such, static ERS(50 μm)=5.8 dB, static ERS(90 μm)=9.0 dB, and static ERS(50 μm)=13.8 dB. For expected dynamic ERS, the 3 dB response is reduced by a factor of 2. As such, the dynamic ERS value of EAM 1 is 2.9 dB, the dynamic ER value of EAM 2 is 4.5 dB, and the dynamic ER value of EAM 3 is 6.9 dB. As described herein, the minimum dynamic ER required for optical link operation is around 4 dB. The minimum required $V_{pp}$ from an RF source may be defined as $V_{pp}$=ER/ERS. Therefore, for EAM 2, with La=90 microns, $W_m$=1.3 microns, and $D_{int}$=0.3 microns, the $V_{pp}$ is 4/4.5, or 0.88V. In various embodiments, due to variations in design geometry and EAM device quality, $V_{pp}$~1V. Consequently, EAM devices with La=90 microns are unable to be directly driven using a single ended SerDes transmitter with a driving voltage of ~0.45V.

FIG. 4A illustrates frequency response curves 400 of S-TWEAM device designs with a filling factor, FF=0.5, and various optical waveguide widths, $W_m$, in accordance with an embodiment of the invention. Specifically, frequency response curves of S-TWEAM devices, S-TWEAM 1, S-TWEAM 2, and S-TWEAM 3 are illustrated in FIG. 4A. The DC-ERS of S-TWEAM 1, S-TWEAM 2, and S-TWEAM 3 is expected to be greater than 17.8 dB/V for providing an AC-ERS that is greater than 4 dB/V at a $V_{pp}$ of 0.45V from the RF source (e.g., SerDes transmitter). S-TWEAM 1, S-TWEAM 2, and S-TWEAM 3 are designed to have the La=70 microns, $D_{int}$=0.3 microns, and FF=0.5. S-TWEAM 1 is designed to have $W_m$=1.3 microns, S-TWEAM 2 is designed to have $W_m$=1.5 microns, and S-TWEAM 3 is designed to have $W_m$=1.8 microns. As shown in FIG. 4A, S-TWEAM 1 has a frequency response curve 402, S-TWEAM 2 has a frequency response curve 404, and S-TWEAM 3 has a frequency response curve 406. As evident from FIG. 4A, the bandwidth of S-TWEAM 1, S-TWEAM 2, and S-TWEAM 3 exceeds the XDR bandwidth requirement at 60 GHz. Furthermore, the frequency response curves 402, 404, and 406 tend to flatten as $W_m$ reduces. In some embodiments, a flat frequency response curve may be an indication of a large signal (eye) pattern. For example, as seen in FIG. 4A, a $W_m$ of 1.5 microns allows for a flat frequency response up to 100 GHz with a maximum frequency response deviation of around 1 dB.

FIG. 4B illustrates frequency response curves 450 of S-TWEAM device designs with a filling factor, FF=0.33, and various optical waveguide widths, $W_m$, in accordance with an embodiment of the invention. In some embodiments, FF influences the frequency response curves (e.g., frequency response curves 406, 408, 410). S-TWEAM 4, S-TWEAM 5, and S-TWEAM 6 are designed to have La=70 microns, $D_{int}$=0.3 microns, FF=0.33, and n=3. S-TWEAM 4 is designed to have an optical waveguide width, $W_m$=1.3 microns; S-TWEAM 5 is designed to have an optical waveguide width, $W_m$=1.5 microns; and S-TWEAM 6 is designed to have an optical waveguide width, $W_m$=1.8 microns. As shown in FIG. 4B, S-TWEAM 4 has a frequency response curve 408, S-TWEAM 5 has a frequency response curve 410, and S-TWEAM 6 has a frequency response curve 412. As evident from FIG. 4B, the bandwidth of S-TWEAM 4, S-TWEAM 5, and S-TWEAM 6 exceeds the XDR bandwidth requirement at 60 GHz. Furthermore, by reducing the FF, e.g., increasing the distance between active sections, the frequency response curves 408, 410, and 412 tend to flatten further. Here, a 1 dB flatness is obtained for bandwidths up to 85 GHz even for the relatively wide (e.g., $W_m$=1.8 microns) device, and is improved further to below 0.5 dB for optical waveguides with shorter $W_m$ (e.g., $W_m$=1.5 microns).

FIG. 5A illustrates frequency response curves 500 of S-TWEAM device designs with an intrinsic region thickness, $D_{int}$=0.25 microns, and various optical waveguide widths, $W_m$, in accordance with an embodiment of the invention. Specifically, frequency response curves of S-TWEAM devices, S-TWEAM 7, S-TWEAM 8, and S-TWEAM 9 are illustrated in FIG. 5A. In some embodiments, for a given static ERS, any change in $D_{int}$ mandates a change in active electrode length (e.g., sum of all electrode segment lengths). For example, for a DC-ERS of 17.8 dB/V, $D_{int}$ of 0.25 microns requires an active electrode length of at least 172 microns, and $D_{int}$ of 0.35 microns requires an active electrode length of at least 242 microns. Accordingly, S-TWEAM 7, S-TWEAM 8, and S-TWEAM 9 are designed to have $D_{int}$=0.25 microns, FF=0.33, La=58 microns, and n=3. Thus, the active electrode length is n*La=174 microns. S-TWEAM 7 is designed to have $W_m$=1.3 microns, S-TWEAM 8 is designed to have $W_m$=1.5 microns, and S-TWEAM 9 is designed to have $W_m$=1.8 microns. As shown in FIG. 5A, S-TWEAM 7 has a frequency response curve 502, S-TWEAM 8 has a frequency response curve 504, and S-TWEAM 9 has a frequency response curve 506. As evident from FIG. 5A, the bandwidth of S-TWEAM 7, S-TWEAM 8, and S-TWEAM 9 exceeds the XDR bandwidth requirement at 60 GHz.

FIG. 5B illustrates frequency response curves 550 of S-TWEAM device designs with an intrinsic region thickness, $D_{int}$=0.25 microns, and various optical waveguide widths, $W_m$, in accordance with an embodiment of the invention. Specifically, frequency response curves of S-TWEAM devices, S-TWEAM 10, S-TWEAM 11, and S-TWEAM 12 are illustrated in FIG. 5B. S-TWEAM 10, S-TWEAM 11, and S-TWEAM 12 are designed to have $D_{int}$=0.25 microns, FF=0.33, La=81 microns, and n=3. Thus, the active electrode length is n*La=243 microns. S-TWEAM 10 is designed to have $W_m$=1.3 microns, S-TWEAM 11 is designed to have $W_m$=1.5 microns, and S-TWEAM 12 is designed to have $W_m$=1.8 microns. As shown in FIG. 5A, S-TWEAM 10 has a frequency response curve 508, S-TWEAM 11 has a frequency response curve 510, and S-TWEAM 12 has a frequency response curve 512. As evident from FIG. 5B, the bandwidth of S-TWEAM 10, S-TWEAM 11, and S-TWEAM 12 exceeds the XDR bandwidth requirement at 60 GHz. Furthermore, as shown in FIGS. 4B, 5A, and 5B, while the 3 dB bandwidth of the frequency responses for S-TWEAM 4, S-TWEAM 5, S-TWEAM 6, S-TWEAM 7, S-TWEAM 8, S-TWEAM 9, S-TWEAM 10, S-TWEAM 11, and S-TWEAM 12 are similar, the frequency response of S-TWEAM 4, S-TWEAM 5, and S-TWEAM 6 at $D_{int}$=0.33 microns, with La=70 microns and n=3, is considerably flatter.

While design examples described in FIGS. 4A, 4B, 5A, and 5B are focused on achieving XDR bandwidth of 60 GHz, embodiments of the present invention may also be used to achieve GDR bandwidth of 120 GHz. FIG. 6 illustrates frequency response curves 600 of S-TWEAM device designs with various optical waveguide widths, $W_m$, for high bandwidth operations, in accordance with an embodiment of the invention. Specifically, frequency response curves of S-TWEAM devices, S-TWEAM 13, S-TWEAM 14, and S-TWEAM 15, are illustrated in FIG. 6. S-TWEAM 13, S-TWEAM 14, and S-TWEAM 15 are designed to have $D_{int}$=0.35 microns, FF=0.33, La=61 microns, and n=4. Thus, the active electrode length is n*La=244 microns. S-TWEAM 13 is designed to have $W_m$=1.3 microns, S-TWEAM 14 is designed to have $W_m$=1.5 microns, and S-TWEAM 15 is designed to have $W_m$=1.8 microns. As shown in FIG. 6, S-TWEAM 13 has a frequency response curve 602, S-TWEAM 14 has a frequency response curve 604, and S-TWEAM 15 has a frequency response curve 608. As evident from FIG. 6, the bandwidth of S-TWEAM 13, S-TWEAM 14, and S-TWEAM 15 exceeds the XDR bandwidth requirement at 120 GHz. Furthermore, as shown in FIG. 6, a 3 dB bandwidth of around 130 dB is achievable even at $W_m$=1.8 microns, even though the corresponding frequency response drops by 2 dB at 120 GHz. Therefore, to achieve high quality eye patterns at GDR frequency range, S-TWEAM 14 with a $W_m$=1.5 microns is preferable. As shown in FIG. 6, the frequency response 604 curve at 120 GHz for S-TWEAM 14 is flatter and drops only by around 1.5 dB.

Example Methods for Generating an Optical Output Signal Using an EAM Device

FIG. 7 illustrates a method for generating an optical output signal using a segmented traveling wave electro-absorption modulator (S-TWEAM) device 700, in accordance with an embodiment of the invention. As shown in block 702, the method may include receiving, from a laser source, a continuous wave (CW) light via an optical waveguide, wherein the optical waveguide comprises a segmented traveling wave (S-TW) electrode structure comprising electrode segments disposed thereon, wherein the optical waveguide comprises alternating active sections and passive sections, and wherein each electrode segment is disposed on a corresponding active section.

In some embodiments, the EAM device (e.g., S-TWEAM device 100) may be monolithically integrated along with the laser source and formed on a chip (e.g., on and/or comprising a substrate) so as to provide an integrated laser-modulator chip. In one aspect, the laser source may be configured to generate a continuous wave (CW) light, laser beam, and/or pulses, and cause the continuous wave (CW) light, laser beam, and/or pulses to propagate through the optical waveguide associated with the EAM device. As described herein, the optical waveguide may include alternating active sections and passive sections, where modulation of the CW laser light primarily occurs in the active sections. Each electrode segment may be disposed on a corresponding active section of the optical waveguide.

As shown in block 704, the method may further include receiving, from a radio frequency (RF) source, an electrical signal having a driving voltage of about 0.45V via an electrical transmission line, wherein the electrical transmission line is operatively coupled to the electrode segments via conducting bridges. In some embodiments, each electrode segment may be in electrical communication with the electrical transmission line via a corresponding conducting bridge. In various embodiments, the RF source may be a SerDes transmitter that may be configured to supply an electrical signal that has a driving voltage that is substantially equal to 0.45V. The electrical signal supplied by the RF source may be efficiently provided to the electrode segments via the electrical transmission line and the conducting bridges.

As shown in block 706, the method may include generating, using the EAM device, an optical output signal based on at least the CW light. In some embodiments, the EAM device may be configured to modulate the continuous wave (CW) light as it propagates through the optical waveguide to encode and/or embed an information signal thereon.

As shown in block 708, the method may further include transmitting the optical output signal via the optical waveguide to an external circuit. In some embodiments, the CW light having an information signal encoded and/or embedded thereon may be transmitted to an optical fiber, free space optics, an external circuit such as an optical transceiver and/or receiver, and/or the like.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| Docket Number | U.S. patent application Ser. No. | Title | Filed On |
|---|---|---|---|
| 048833.000146 | To be assigned | DIFFERENTIAL TRAVELING WAVE ELECTRO-ABSORPTION MODULATOR FOR HIGH BANDWIDTH OPERATION | Filed Concurrently Herewith |

What is claimed is:

1. An electro-absorption modulator (EAM) device comprising:
   an optical waveguide comprising a waveguide core configured to facilitate a propagation of an optical signal therethrough;
   a segmented traveling wave electrode structure comprising electrode segments disposed on the optical waveguide; and
   an electrical transmission line operatively coupled to the electrode segments via conducting bridges, wherein the electrical transmission line is configured to facilitate a propagation of an electrical signal therethrough,
   wherein dimensions of the optical waveguide and the electrode segments are defined by using the product of a dynamic extinction ratio slope (ERS), a bandwidth of the EAM device, and a width of the optical waveguide.

2. The EAM device of claim 1, wherein the optical waveguide comprises alternating active sections and passive sections.

3. The EAM device of claim 2, wherein each electrode segment is disposed on a corresponding active section.

4. The EAM device of claim 2, wherein the optical waveguide further comprises a continuous multi-quantum well (MQW) layer stack, wherein portions of the MQW layer stack disposed in the active sections have an energy gap defining an active energy gap value, and portions of the MQW layer stack disposed in the passive sections have an energy gap defining a passive energy gap value, wherein the passive energy gap value is greater than the active energy gap value to maintain low insertion loss.

5. The EAM device of claim 2, wherein:
   a length of each electrode segment is within a range of about 25 microns to about 90 microns,
   a width of the optical waveguide is within a range of about 0.8 microns to about 1.8 microns,
   a thickness of an intrinsic region of the optical waveguide is within a range of about 0.22 microns to about 0.35 microns, and
   an electrode filling factor associated with the EAM device is within a range of about 0.25 to about 0.5.

6. The EAM device of claim 5, wherein a minimum number of active sections required to meet an extinction ratio requirement for optical link operation is 2.

7. The EAM device of claim 5, wherein the EAM device meets a bandwidth requirement associated with XDR optical links or GDR optical links, wherein the bandwidth requirement of XDR optical links is 60 GHz, and the bandwidth requirement of GDR optical links is 120 GHz.

8. The EAM device of claim 1, wherein the EAM device is monolithically integrated along with a laser source on a same chip.

9. The EAM device of claim 1, wherein the EAM device is configured for operation by an RF source in a direct drive modulation mode, wherein the RF source is a Serializer-Deserializer (SerDes) transmitter.

10. The EAM device of claim 1, wherein the optical waveguide comprises at least a ridge waveguide or a buried heterostructure (BH) waveguide.

11. The EAM device of claim 1, wherein the electrode segments and the electrical transmission line are configured to provide velocity matching between the electrical signal and the optical signal.

12. The EAM device of claim 1, wherein the electrical transmission line is a microstrip transmission line.

13. The EAM device of claim 1, wherein:

the electrical transmission line has a width within a range of about 3 microns to about 10 microns and a thickness within a range of about 1.0 microns to about 3 microns;

an insulating spacer layer associated with the electrical transmission line, wherein the insulating spacer layer has a thickness within a range of about 4.5 microns to about 7 microns; and a resulting unloaded electrical transmission line impedance within a range of about 60Ω to about 130Ω.

14. An electro-absorption modulator (EAM) device comprising:

an optical waveguide comprising alternating active sections and passive sections, wherein the optical waveguide is configured to facilitate a propagation of an optical signal therethrough;

a segmented traveling wave electrode structure comprising electrode segments disposed on the waveguide; and an electrical transmission line operatively coupled to the electrode segments via conducting bridges, wherein the electrical transmission line is configured to facilitate a propagation of an electrical signal therethrough, wherein the EAM device is configured for operation by an RF source in a direct drive modulation mode, wherein the RF source is a Serializer-Deserializer (SerDes) transmitter that is configured to supply the electrical signal at a driving voltage of 0.45V, and wherein dimensions of the optical waveguide and the electrode segments are defined by using the product of a dynamic extinction ratio slope (ERS), a bandwidth of the EAM device, and a width of the optical waveguide.

15. The EAM device of claim 14, wherein:

a length of each electrode segment is within a range of about 25 microns to about 90 microns, a width of the waveguide is within a range of about 0.8 microns to about 1.8 microns, a thickness of an intrinsic region of the waveguide is within a range of about 0.22 microns to about 0.35 microns, and an electrode filling factor associated with the EAM device is within a range of about 0.25 to about 0.5.

16. The EAM device of claim 15, wherein the EAM device meets a bandwidth requirement associated with XDR optical links or GDR) optical links, wherein the bandwidth requirement of XDR optical links is 60 GHz, and the bandwidth requirement of GDR optical links is 120 GHz.

17. The EAM device of claim 14, wherein the waveguide comprises at least a ridge waveguide or a buried heterostructure (BH) waveguide.

18. A method of generating an optical output signal using an electro-absorption modulator (EAM) device, the method comprising:

receiving, from a laser source, a continuous wave (CW) light via an optical waveguide, wherein the optical waveguide comprises a segmented traveling wave (S-TW) electrode structure comprising electrode segments disposed thereon, wherein the optical waveguide comprises alternating active sections and passive sections, wherein each electrode segment is disposed on a corresponding active section;

receiving, from a radio frequency (RF) source, an electrical signal having a driving voltage of about 0.45V via an electrical transmission line, wherein the electrical transmission line is operatively coupled to the electrode segments via conducting bridges;

generating, using the EAM device, an optical output signal based on at least the CW light; and transmitting the optical output signal via the optical waveguide to an external circuit, wherein dimensions of the optical waveguide and the electrode segments are defined by using the product of a dynamic extinction ratio slope (ERS), a bandwidth of the EAM device, and a width of the optical waveguide.

19. The method of claim 18, wherein the EAM device meets a bandwidth requirement associated with XDR optical links or GDR optical links, wherein the bandwidth requirement of XDR optical links is 60 GHz, and the bandwidth requirement of GDR optical links is 120 GHz.

20. The method of claim 18, wherein the EAM device is monolithically integrated along with the laser source on a same chip.

* * * * *